(12) United States Patent
Guo et al.

(10) Patent No.: US 8,061,127 B2
(45) Date of Patent: Nov. 22, 2011

(54) THERMAL MANAGEMENT OF DIESEL PARTICULATE FILTER REGENERATION EVENTS

(75) Inventors: Linsong Guo, Columbus, IN (US); Timothy R. Frazier, Columbus, IN (US); Morgan Andreae, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 672 days.

(21) Appl. No.: 12/111,831

(22) Filed: Apr. 29, 2008

(65) Prior Publication Data

US 2009/0266055 A1    Oct. 29, 2009

(51) Int. Cl.
*F01N 3/00* (2006.01)

(52) U.S. Cl. ........ 60/295; 60/285; 60/286; 60/297; 60/301; 123/299; 123/300; 123/305

(58) Field of Classification Search ........ 60/274, 60/277, 285, 286, 295, 297; 123/196 R, 123/299, 300, 305
See application file for complete search history.

(56) References Cited

U.S. PATENT DOCUMENTS

| | | | |
|---|---|---|---|
| 6,491,016 B1 | 12/2002 | Buratti | |
| 6,622,480 B2 | 9/2003 | Tashiro et al. | |
| 6,644,020 B2 | 11/2003 | Kuenstler et al. | |
| 6,666,020 B2 * | 12/2003 | Tonetti et al. | 60/286 |
| 6,901,747 B2 | 6/2005 | Tashiro et al. | |
| 6,948,476 B2 | 9/2005 | Gioannini et al. | |
| 7,044,118 B2 | 5/2006 | Tonetti et al. | |
| 7,104,049 B2 * | 9/2006 | Hiranuma et al. | 60/295 |
| 7,331,171 B2 * | 2/2008 | Chiba et al. | 60/286 |
| 7,343,735 B2 * | 3/2008 | Wang et al. | 60/286 |
| 7,533,524 B2 * | 5/2009 | Wang et al. | 60/297 |
| 7,611,567 B2 * | 11/2009 | Chiba et al. | 95/278 |
| 7,775,037 B2 * | 8/2010 | Ishibashi | 60/287 |
| 7,845,165 B2 * | 12/2010 | Satou et al. | 60/295 |
| 2003/0046929 A1 | 3/2003 | Terada et al. | |
| 2004/0244366 A1 | 12/2004 | Hiranuma et al. | |
| 2007/0214772 A1 | 9/2007 | England | |

FOREIGN PATENT DOCUMENTS

| | | |
|---|---|---|
| EP | 1 281 852 A2 | 5/2003 |
| EP | 1 350 941 B1 | 12/2004 |
| EP | 1662101 A1 | 5/2006 |
| EP | 1 363 009 B1 | 6/2006 |
| EP | 1 122 417 B1 | 9/2006 |
| EP | 1 744 042 A1 | 1/2007 |

OTHER PUBLICATIONS

PCT/US2009/042131, International Search Results and Written Opinion, Dec. 1, 2009.

* cited by examiner

*Primary Examiner* — Binh Q Tran (74) *Attorney, Agent, or Firm* — Kunzler Needham Massey & Thorpe (57) ABSTRACT

Various embodiments of an apparatus, system, and method are disclosed for managing regeneration event characteristics. For example, according to one embodiment, an apparatus for controlling the temperature of the outlet exhaust of an internal combustion engine for a regeneration event on a particulate matter filter includes a regeneration module and a fuel injection strategy module. The regeneration module is configured to determine a desired engine outlet exhaust gas temperature for a regeneration event. The fuel injection strategy module is configured to determine a regeneration fuel injection strategy for achieving the desired engine outlet exhaust gas temperature. The regeneration fuel injection strategy includes a main fuel injection, a first heat post-injection, and a second heat post-injection. In certain implementations, the fuel injection strategy also includes at least one or two non-heat post-injections for achieving a desired particulate filter inlet exhaust gas temperature.

25 Claims, 7 Drawing Sheets

THERMAL MANAGEMENT OF DIESEL PARTICULATE FILTER REGENERATION EVENTS

FIELD

This disclosure relates to controlling regeneration events on a diesel particulate filter (DPF) of an internal combustion engine system, and more particularly to the thermal management of the DPF regeneration events.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards, to which all engines must comply. Generally, emission requirements vary according to engine type. Emission tests for compression-ignition (diesel) engines typically monitor the release of diesel particulate matter (PM), nitrogen oxides ($NO_x$), and unburned hydrocarbons (UHC). Catalytic converters implemented in an exhaust gas after-treatment system have been used to eliminate many of the pollutants present in exhaust gas. However, to remove diesel particulate matter, typically a diesel particulate filter (DPF) must be installed downstream from a catalytic converter, or in conjunction with a catalytic converter.

A common DPF comprises a porous ceramic matrix with parallel passageways through which exhaust gas passes. Particulate matter subsequently accumulates on the surface of the filter, creating a buildup which must eventually be removed to prevent obstruction of the exhaust gas flow. Common forms of particulate matter are ash and soot. Ash, typically a residue of burnt engine oil, is substantially incombustible and builds slowly within the filter. Soot, chiefly composed of carbon, results from incomplete combustion of fuel and generally comprises a large percentage of particulate matter buildup. Various conditions, including, but not limited to, engine operating conditions, mileage, driving style, terrain, etc., affect the rate at which particulate matter accumulates within a diesel particulate filter.

Accumulation of particulate matter typically causes backpressure within the exhaust system. Excessive backpressure on the engine can degrade engine performance. Particulate matter, in general, oxidizes in the presence of $NO_2$ at modest temperatures, or in the presence of oxygen at higher temperatures. If too much particulate matter has accumulated when oxidation begins, the oxidation rate may get high enough to cause an uncontrolled temperature excursion. The resulting heat can destroy the filter and damage surrounding structures. Recovery can be an expensive process.

To prevent potentially hazardous situations, accumulated particulate matter is commonly oxidized and removed in a controlled regeneration process before excessive levels have accumulated. To oxidize the accumulated particulate matter, exhaust gas temperatures generally must exceed the temperatures typically reached at the filter inlet. Consequently, additional methods to initiate regeneration of a diesel particulate filter may be used. In one method, a reactant, such as diesel fuel, is introduced into an exhaust after-treatment system to initiate oxidation of particulate buildup and to increase the temperature of the filter. A filter regeneration event occurs when substantial amounts of soot are consumed on the particulate filter.

A controlled regeneration can be initiated by the engine's control system when a predetermined amount of particulate has accumulated on the filter, when a predetermined time of engine operation has passed, or when the vehicle has driven a predetermined number of miles. Oxidation from oxygen ($O_2$) generally occurs on the filter at temperatures above about 400 degrees centigrade, while oxidation from nitric oxides ($NO_2$), sometimes referred to herein as noxidation, generally occurs at temperatures between about 250 C and 400 C. Controlled regeneration typically consists of driving the filter temperature up to $O_2$ oxidation temperature levels for a predetermined time period such that oxidation of soot accumulated on the filter takes place.

A controlled regeneration can become uncontrolled if the oxidation process drives the temperature of the filter upwards more than is anticipated or desired, sometimes to the point beyond which the filter substrate material can absorb the heat, resulting in melting or other damage to the filter. Less damaging uncontrolled or spontaneous regeneration of the filter can also take place at noxidation temperatures, i.e., when the filter temperature falls between about 250 C and 400 C. Such uncontrolled regeneration generally does not result in runaway temperatures, but can result in only partial regeneration of the soot on the filter. Partial regeneration can also occur when a controlled regeneration cannot continue because of a drop in temperature, exhaust gas flow rate, or the like. Partial regeneration and other factors can result in non-uniformity of soot distribution across the filter, resulting in soot load estimation inaccuracies and other problems.

The temperature of the particulate filter is dependent upon the temperature of the exhaust gas entering the particulate filter. Accordingly, the temperature of the exhaust must be carefully managed to ensure that a desired particulate filter inlet exhaust gas temperature is accurately and efficiently reached and maintained for a desired duration to achieve a controlled regeneration event that produces desired results.

Conventional systems use various strategies for managing the particulate filter inlet exhaust gas temperature. For example, some systems use a combination of air handling strategies, internal fuel dosing strategies, and external fuel dosing strategies. The air handling strategies include managing an air intake throttle to regulate the air-to-fuel ratio. Lower air-to-fuel ratios, e.g., richer air/fuel mixtures, typically produce higher engine outlet exhaust gas temperatures. Internal fuel dosing strategies include injecting additional fuel into the compression cylinders. Such in-cylinder injections include pre-injections or fuel injections occurring before a main fuel injection and post-injections or fuel injection occurring after a main fuel injection. Generally, post-injections include heat post-injections and non-heat post-injections. Heat post-injections are injections that participate along with the main fuel injection in the combustion event within the cylinder and occur relatively soon after the main fuel injection. Non-heat post injections are injections that occur later in the expansion stroke compared to the heat post-injections and do not participate in the combustion event within the cylinder.

In internal combustions engines, unburned fuel can be forced by a combustion event to slip past, e.g., blow-by, the seals between the piston head and the wall of the compression cylinder. The unburned fuel that slips past the seals enters the crankshaft case chamber below the compression cylinders and intermixes with, e.g., dilutes, lubricating oil stored in the chamber. The fuel dilution level of an engine then is a measure of unburned fuel in the lubricating oil in the crankshaft case (often expressed as the percentage of unburned fuel in the fuel/oil mixture). Most engines generate normal amounts of fuel dilution (e.g., less than about 3%-5%), which often evaporates from the heat of the engine without negatively affecting the engine. However, when fuel dilution levels reach above-normal levels, the fuel does not burn off and may excessively thin the oil. Fuel diluted oil having excessively high fuel dilution levels can lower the lubricating properties of the oil, which can cause a drop in oil pressure and an increase in engine wear. Therefore, preventing the fuel dilution level of an engine from reaching above-normal amounts is an important part of proper engine maintenance and performance.

Although conventional regeneration fuel injection strategies may be adequate for controlling the temperature of exhaust generated by the engine, they often fail to maintain acceptable fuel dilution levels. For example, conventional systems with one heat post-injection participating in the combustion of fuel within the cylinder results in excessively high fuel dilution levels. Further, conventional regeneration fuel injection strategies result in more than typical amounts of fuel being injected into the compression cylinder. As discussed above, some of this fuel does not participate in the combustion event, i.e., the fuel is not combusted, and is not vaporized. With more fuel being injected into the compression cylinder than can be combusted and less vaporization of the fuel, the cylinders often contain excessive amounts of unburned and unvaporized fuel, which typically leads to increased fuel dilution levels.

Based on the foregoing, a need exists for a fuel injection strategy that achieves targeted engine outlet exhaust for desired regeneration events while maintaining fuel dilution levels at or below an acceptable level for the engine.

SUMMARY

The subject matter of the present application has been developed in response to the present state of the art, and in particular, in response to the problems and needs in the art that have not yet been fully solved by currently available fuel injection strategies for regeneration events. Accordingly, the subject matter of the present application has been developed to provide apparatus, systems, and methods for controlling exhaust gas temperatures and fuel dilution levels that overcomes at least some shortcomings of the prior art regeneration fuel injection strategies.

For example, according to one embodiment, an apparatus for controlling the temperature of the outlet exhaust of an internal combustion engine for a regeneration event on a particulate matter filter includes a regeneration module and a fuel injection strategy module. The regeneration module is configured to determine a desired engine outlet exhaust gas temperature for a regeneration event. The fuel injection strategy module also is configured to determine a regeneration fuel injection strategy for achieving the desired engine outlet exhaust gas temperature. The regeneration fuel injection strategy includes a main fuel injection, a first heat post-injection, and a second heat post-injection.

In certain implementations, the regeneration module is further configured to determine a desired particulate matter filter inlet exhaust gas temperature. The fuel injection strategy module can be configured to determine a regeneration fuel injection strategy for achieving the desired engine outlet exhaust gas temperature and desired particulate matter filter inlet exhaust gas temperature. Additionally, the fuel injection strategy can also include at least one or two non-heat post-injections.

In some implementations, the main fuel injection is scheduled to occur at a crank angle of approximately zero-degrees, the first heat post-injection is scheduled to occur at a crank angle between approximately 8-degrees and approximately 30-degrees, and the second heat post-injection is scheduled to occur at a crank angle between approximately 30-degrees and approximately 63-degrees. The crank angle at which the second heat post-injection is scheduled to occur can be at least 5-degrees greater than the crank angle at which the first heat post-injection is scheduled to occur. Further, the at least one non-heat post-injection can be scheduled to occur at a crank angle between approximately 150-degrees and approximately 170-degrees. In implementations having two non-heat post-injections, the second non-heat post-injection can occur between approximately 160-degrees and approximately 180-degrees while the engine exhaust valve is opening. Moreover, the crank angle at which the second non-heat post-injection is scheduled to occur can be at least 2-degrees greater than the crank angle at which the first non-heat post-injection is scheduled to occur. As defined herein, a fuel injection scheduled to "occur" at a crank angle can mean the injection is scheduled to start injecting at the crank angle.

According to some implementations, the apparatus further includes a fuel dilution module that is configured to determine a maximum fuel dilution level of the engine. In such implementations, the regeneration fuel injection strategy can be configured to achieve an actual fuel dilution level below or equal to the maximum fuel dilution level. The maximum fuel dilution level can be less than or equal to approximately 5%.

In yet other implementations, a fuel dosage of the first heat post-injection is between about 100% and about 500% of a fuel dosage of the main fuel injection, a fuel dosage of the second heat post-injection is between about 100% and about 200% of the fuel dosage of the first heat post-injection, and a fuel dosage of the at least one non-heat post-injection is between about 10% and about 100% of the fuel dosage of the second heat post-injection.

According to another embodiment, a method for controlling the temperature of the outlet exhaust of an internal combustion engine for a regeneration event on a particulate matter filter includes determining a desired engine outlet exhaust gas temperature and determining a maximum fuel dilution level of the engine. The method also includes determining a regeneration fuel injection strategy for achieving the desired engine outlet exhaust gas temperature and an actual fuel dilution level at or below the maximum fuel dilution level. The regeneration fuel injection strategy includes a main fuel injection, a first heat post-injection, and a second heat post-injection. The method further includes injecting fuel into a compression chamber of the internal combustion engine according to the regeneration fuel injection strategy.

According to some implementations, the method further includes determining a desired particulate matter inlet exhaust gas temperature. Determining the regeneration fuel injection strategy can include determining a regeneration fuel injection strategy for achieving the desired engine outlet exhaust gas temperature, the desired particulate matter inlet exhaust gas temperature, and an actual fuel dilution level at or below the maximum fuel dilution level. In such implementations, the fuel injection strategy further comprises at least one non-heat post-injection.

In specific instances, the main fuel injection is scheduled to occur at a crank angle of approximately zero-degrees, the first heat post-injection is scheduled to occur at a crank angle between approximately 8-degrees and approximately 30-degrees, the second heat post-injection is scheduled to occur at a crank angle between approximately 30-degrees and approximately 63-degrees, and the at least one non-heat post-injection is scheduled to occur at a crank angle between approximately 150-degrees and approximately 170-degrees.

In yet certain other implementations, the desired engine outlet exhaust gas temperature is a first desired engine outlet exhaust gas temperature that corresponds to a first operating condition of the engine, the regeneration fuel injection strategy is a first regeneration fuel injection strategy, and the main fuel injection is a first main fuel injection. The method can also include determining a second desired engine outlet exhaust gas temperature that corresponds to a second operating condition of the engine. Additionally, the method includes determining a second regeneration fuel injection strategy for achieving the second desired engine outlet exhaust gas temperature and an actual fuel dilution level at or below the maximum fuel dilution level. The second regeneration fuel injection strategy can include a second main fuel injection, a third heat post-injection, and a fourth heat post-injection. The third heat post-injection can be different than the second main injection and second heat post-injection, and the fourth heat post-injection can be different that the second heat post-injection. The method can then include injecting fuel into the compression chamber according to the second regeneration fuel injection strategy. According to some implementations, the maximum fuel dilution level is a first maximum fuel dilution level and the method includes determining a second maximum fuel dilution level corresponding to the second operating condition of the engine. The method includes determining a second regeneration fuel injection strategy that also achieves an actual fuel dilution level at or below the second maximum fuel dilution level.

According to yet another embodiment, an internal combustion engine system includes an internal combustion engine generating an engine outlet exhaust, a particulate matter filter in exhaust receiving communication with the internal combustion engine, and a controller. The controller includes an engine conditions module, a regeneration module, and a thermal management module. The engine conditions module is configured to determine operating conditions of the engine. The regeneration module is configured to determine a desired temperature of the engine outlet exhaust. The desired engine outlet exhaust gas temperature is based at least partially on a desired particulate matter filter inlet temperature for conducting a regeneration event on the particulate matter filter. The thermal management module is configured to determine (i) a fuel dilution threshold level of the internal combustion engine and (ii) a regeneration fuel injection strategy for achieving the desired engine outlet exhaust gas temperature and an actual fuel dilution level below the fuel dilution threshold level. The regeneration fuel injection strategy includes a first primary combustion fuel injection, a second subsidiary combustion fuel injection following the first primary combustion fuel injection, and a third subsidiary combustion fuel injection following the second subsidiary combustion fuel injection.

In some implementations, the regeneration fuel injection strategy is further configured to achieve the desired particulate matter filter inlet exhaust gas temperature. In such implementations, the regeneration fuel injection strategy includes a fourth subsidiary non-combustion fuel injection following the third subsidiary combustion fuel injection. Also, in some implementations, the regeneration fuel injection strategy includes a fifth subsidiary non-combustion fuel injection following the fourth subsidiary non-combustion fuel injection.

According to specific implementations, the first primary combustion fuel injection is scheduled to occur at a crank angle of about zero-degrees, the second subsidiary combustion fuel injection is scheduled to occur at a crank angle between approximately 8-degrees and approximately 30-degrees, the third subsidiary combustion fuel injection is scheduled to occur at a crank angle between approximately 30-degrees and approximately 63-degrees, and the fourth subsidiary combustion fuel injection at a crank angle between approximately 150-degrees and approximately 170-degrees.

According to some implementations, the fuel dosage of the second subsidiary combustion fuel injection is less than the fuel dosage of the first primary combustion fuel injection. Moreover, the fuel dosage of the third subsidiary combustion fuel injection is equal to or less than the fuel dosage of the second subsidiary combustion fuel injection. In certain instances, the fuel dosage of the second subsidiary combustion fuel injection is between about 5% and about 100% of the fuel dosage of the first primary combustion fuel injection, and the fuel dosage of the third subsidiary combustion fuel injection is between about 5% and about 100% of the fuel dosage of the second subsidiary combustion fuel injection.

According to yet some implementations, the fuel dosage of the second subsidiary combustion fuel injection is less than the fuel dosage of the first primary combustion fuel injection, the fuel dosage of the third subsidiary combustion fuel injection is equal to or less than the fuel dosage of the second subsidiary combustion fuel injection, and the fuel dosage of the fourth subsidiary non-combustion fuel injection is less than the fuel dosage of the third subsidiary combustion fuel injection. The fuel dosage of the second subsidiary combustion fuel injection can be between about 5% and about 100% of the fuel dosage of the first primary combustion fuel injection, the fuel dosage of the third subsidiary combustion fuel injection can be between about 5% and about 100% of the fuel dosage of the second subsidiary combustion fuel injection, and the fuel dosage of the fourth subsidiary non-combustion fuel injection can be between about 10% and about 100% of the fuel dosage of the third subsidiary combustion fuel injection.

In another exemplary embodiment, a fuel injection strategy for injecting fuel into a compression chamber of an internal combustion engine includes a main fuel injection, a first subsidiary fuel injection following the main fuel injection, a second subsidiary fuel injection following the first subsidiary fuel injection, and a third subsidiary fuel injection following the second subsidiary fuel injection. The main, first subsidiary, and second subsidiary fuel injections are scheduled to participate in a combustion event within the compression chamber. The third subsidiary fuel injection is scheduled to not participate in the combustion event within the compression chamber.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the subject matter described herein may be combined in any suitable manner in one or more embodiments. In the following description, numerous specific details are provided, such as examples of controls, structures, algorithms, programming, software modules, user selections, network transactions, database queries, database structures, hardware modules, hardware circuits, hardware chips, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

Figure 1:
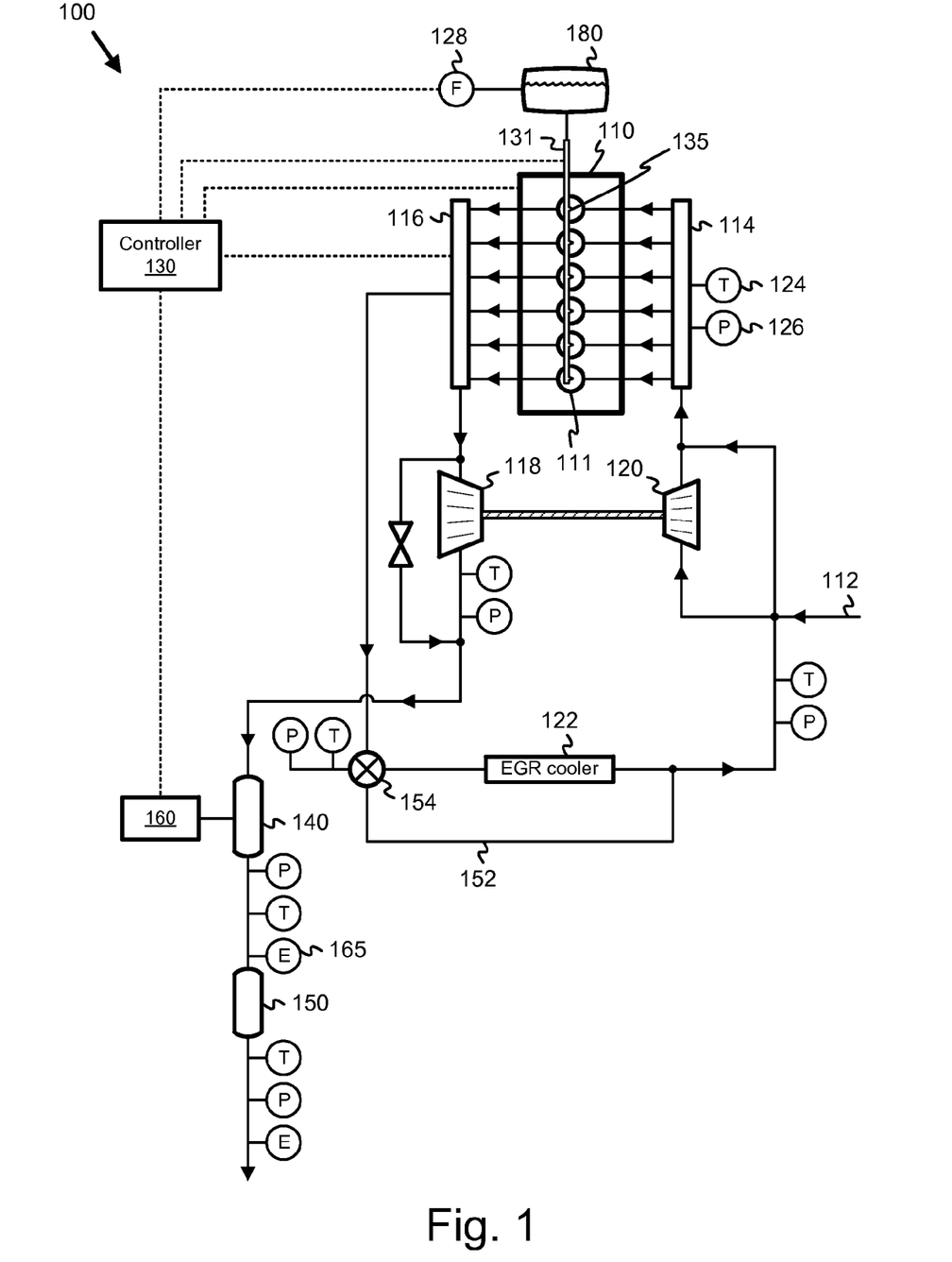
FIG. 1 is a schematic diagram of an engine system having a particulate filter according to one embodiment.

FIG. 1 depicts one exemplary embodiment of an internal combustion engine system, such as a diesel engine system 100, in accordance with the present invention. As illustrated, the engine system 100 may include a diesel engine 110, a controller 130, fuel injectors 135, catalytic component 140, particulate filter 150, and fuel tank 180.

The engine system 100 may further include an air inlet 112, intake manifold 114, exhaust manifold 116, turbocharger turbine 118, turbocharger compressor 120, exhaust gas recirculation (EGR) cooler 122, temperature sensors 124, pressure sensors 126, and fuel sensors 128. In one embodiment, the air inlet 112 is vented to the atmosphere, enabling air to enter the engine system 100. The air inlet 112 may be connected to an inlet of the intake manifold 114. The intake manifold 114 includes an outlet operatively coupled to the combustion chambers 111 of the engine 110. Within the engine 110, compressed air from the atmosphere is combined with fuel to power the engine 110, which comprises operation of the engine 110. The fuel comes from the fuel tank 180 through a fuel delivery system including, in one embodiment, a fuel pump and common rail 131 to the fuel injectors 135, which injects fuel into the combustion chambers 111 of the engine 110. Fuel injection timing is controlled by the controller 130. Combustion of the fuel produces exhaust gas that is operatively vented to the exhaust manifold 116. From the exhaust manifold 116, a portion of the exhaust gas may be used to power a turbocharger turbine 118. The turbine 118 may drive a turbocharger compressor 120, which compresses engine intake air before directing it to the intake manifold 114.

At least a portion of the exhaust gases output from the exhaust manifold 116 is directed to the particulate filter 150 for filtering of particulate matter before venting to the atmosphere. The exhaust gas may pass through one or more catalytic components 140 to further reduce the number of pollutants and elevate the temperature to a desired filter inlet exhaust gas temperature for regenerating the particulate filter 150. A regeneration mechanism 160 regenerates the filter 150, with the controller 130 establishing a regeneration vector and directing the regeneration mechanism 160 to regenerate the filter 150 in a regeneration profile in accordance with the regeneration vector, as further detailed below.

Particulate matter produced by the engine 110 comprises ash and soot. Soot accumulates much faster than ash, such that, in many cases, particularly when the filter has been in operation for a relatively short period, an estimate of the rate of total particulate accumulation can be satisfactorily generated by estimating the rate of soot accumulation, treating the ash accumulation rate as negligible.

Some amount of the exhaust gas may be re-circulated to the engine 110, according to a proportion set by the controller 130. In certain embodiments, the EGR cooler 122, which is operatively connected to the inlet of the intake manifold 114, cools exhaust gas in order to facilitate increased engine air inlet density. In one embodiment, an EGR valve 154 diverts the exhaust gas past the EGR cooler 122 through an EGR bypass 152.

Various sensors, such as temperature sensors 124, pressure sensors 126, fuel sensor 128, exhaust gas flow sensors 165, and the like, may be strategically disposed throughout the engine system 100 and may be in communication with the controller 130 to monitor operating conditions. In one embodiment, the fuel sensor 128 senses the amount of fuel consumed by the engine, and the exhaust gas flow sensors 165 sense the rate at which exhaust gas is flowing at the particulate filter 150.

Engine operating conditions can be ascertained from any of the sensors or from the controller 130's commands to the engine regarding the fraction of exhaust gas recirculation, injection timing, and the like. In one embodiment, information is gathered regarding, for example, fuel rate, engine speed, engine load, the timing at which fuel injection timing is advanced or retarded (SOI, or start of injection), time passed, fraction of exhaust gas recirculation, driving conditions, whether and when regenerations have occurred and the rate such regenerations have removed particulate matter, exhaust flow rate, the amount of $O_2$ and $NO_2$ in the exhaust, filter temperature, exhaust gas pressure, filter particulate load amount and uniformity, etc.

The engine 110 will produce soot and ash at a rate that will vary according to the type of engine, such as, for example, an 11-liter or 15-liter diesel engine. Additionally, the rate of particulate production will vary according to engine operating conditions such as fuel rate, EGR fraction, and SOI timing. Other factors may also bear on the particulate production rate, some depending heavily on the engine platform being considered, with others closer to being platform-independent.

Although the engine system 100 shown in FIG. 1 uses an internal fuel injection approach to controlling the exhaust gas temperature for regeneration events, in other embodiments, an external fuel injection approach can be used in conjunction with the non-additive fuel injection strategies described herein. The external fuel injection approach can be the same as or similar to the approach described in U.S. Pat. No. 7,263,825, which is incorporated herein by reference.

Figure 2:
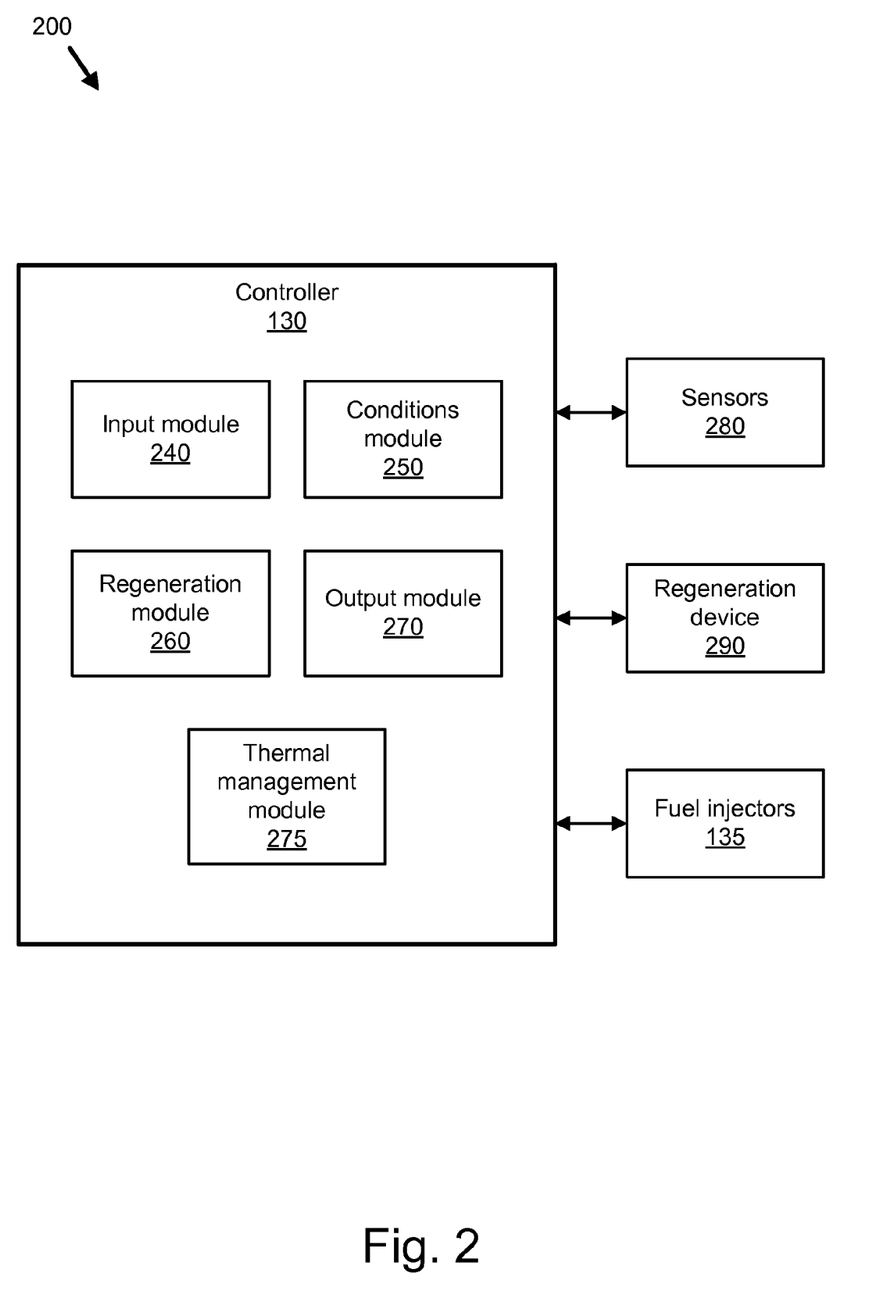
FIG. 2 is a schematic diagram of a controller of the engine system according to one embodiment.

FIG. 2 depicts a control system 200 according to one representative embodiment. The control system 200 comprises the controller 130, the sensors 280, a regeneration device 290, and the fuel injectors 135. The sensors 280 may include the sensors 124, 126, and 165 of FIG. 1. The regeneration device 290 may correspond to the regeneration mechanism 160.

The controller 130 comprises an input module 240, a conditions module 250, a regeneration module 260, an output module 270, and a thermal management module 275.

As is known in the art, the controller 130 and components may comprise processor, memory, and interface modules that may be fabricated of semiconductor gates on one or more semiconductor substrates. Each semiconductor substrate may be packaged in one or more semiconductor devices mounted on circuit cards. Connections between the modules may be through semiconductor metal layers, substrate-to-substrate wiring, or circuit card traces or wires connecting the semiconductor devices.

The sensors 280 are configured to determine a plurality of conditions within the engine system 100, including temperature, pressure, exhaust gas flow rate, etc. The regeneration device 290 is configured to regenerate the filter 150 at the direction of the controller 130. The input module 240 is configured to input the conditions sensed by the sensors 280 and provide corresponding inputs to the regeneration module 260, which creates a regeneration vector according to the inputs. The conditions module 250 is configured to gather information regarding current conditions of the engine system 100, based on the conditions sensed by the sensors 280 and/or other inputs including commands issued to system components by the controller 130. The output module 270 is configured to direct the regeneration device 290 to regenerate the filter 150 according to regeneration instructions generated by the by the regeneration module 260 and the current conditions determined by the conditions module 250. The output module 270 also is configured to direct the fuel injectors 135 to inject fuel into the compression chambers 111 of the engine 110 according to a fuel injection strategy determined by the thermal management module 275.

Figure 3:
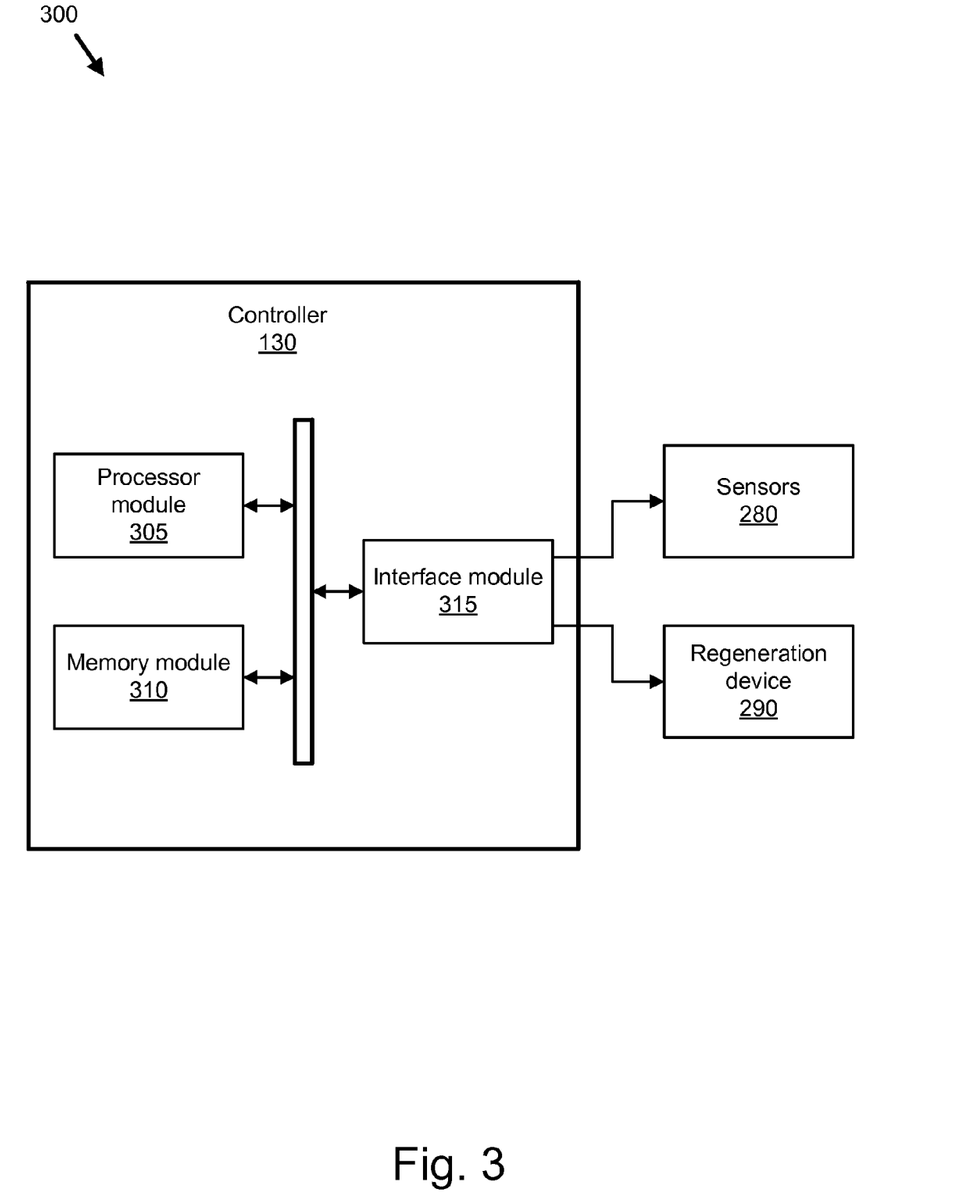
FIG. 3 is a schematic diagram of a controller of the engine system according to another embodiment.

FIG. 3 is a schematic block diagram illustrating another embodiment of the control system 200 of FIG. 2. The controller 130 is depicted as comprising a processor module 305, memory module 310, and interface module 315. The processor module 305, memory module 310, and interface module 315 may be fabricated of semiconductor gates on one or more semiconductor substrates. Each semiconductor substrate may be packaged in one or more semiconductor devices mounted on circuit cards. Connections between the processor module 305, the memory module 310, and the interface module 315 may be through semiconductor metal layers, substrate to substrate wiring, or circuit card traces or wires connecting the semiconductor devices.

The memory module 310 stores software instructions and data comprising one or more software processes. The processor module 305 executes the software processes as is known to those skilled in the art. In one embodiment, the processor module 305 executes one or more software processes carried out by the conditions module 250, regeneration module 260, and thermal management module 275 of FIG. 2.

The processor module 305 may communicate with external devices and sensors such as the sensors 280, the regeneration device 290, and the fuel injectors 135 of FIG. 2 through the interface module 315. For example, the sensors 280 may comprise a pressure sensor 126 (FIG. 1), with the sensors 280 communicating an analog signal representing a pressure value to the interface module 315. The interface module 315 may periodically convert the analog signal to a digital value and communicate the digital value to the processor module 305.

The interface module 315 may also receive one or more digital signals through a dedicated digital interface, a serial digital bus communicating a plurality of digital values, or the like. For example, the sensors 280 may comprise the air-flow sensor 156 of FIG. 1 and communicate a digital air flow value to the interface module 315. The interface module 315 may periodically communicate the digital air flow value to the processor module 305. In one embodiment, the interface module 315 executes one or more communication processes carried out by the input module 240 and output module 270 of FIG. 2.

The processor module 305 may store digital values such as the pressure value and the air flow value in the memory module 310. In addition, the processor module 305 may employ the digital values in one or more calculations including calculations carried out by the conditions module 250 and regeneration module 260. The processor module 305 may also control one or more devices such as the fuel injectors 135 and regeneration device 290 through the interface module 315.

The regeneration module 260 is configured to generate a regeneration command, e.g., regeneration instructions, representing a request to initiate a regeneration event on the particulate filter 150 and the desired characteristics of the regeneration event. In other words, the regeneration module 260 commands the regeneration device when to perform a regeneration event, how long to perform the regeneration event, the rate of regeneration during the regeneration event, and determines the desired temperature of the exhaust entering the particulate filter (e.g., desired filter inlet exhaust gas temperature 460) necessary to achieve the desired characteristics of the regeneration event.

Based on the desired filter inlet exhaust gas temperature 460 (i.e., desired catalyst component or DOC outlet exhaust gas temperature), the regeneration module 260 is configured to determine a desired temperature of the exhaust exiting the exhaust manifold 116 (e.g., desired engine outlet exhaust gas temperature 440). In embodiments in which a catalytic component is not positioned in the exhaust gas stream between the exhaust manifold 116 and the particulate filter 150, the regeneration module 260 sets the desired engine outlet exhaust gas temperature equal to the desired filter inlet exhaust gas temperature. However, in embodiments where the engine system 100 includes a catalytic component 140, the regeneration module 260 compensates for any temperature changes in the exhaust due to operation of the catalytic component by setting the desired engine outlet exhaust gas temperature such that the exhaust exiting the catalytic component is approximately equal to the desired filter inlet exhaust gas temperature.

Generally, the regeneration command and associated regeneration event characteristics are dependent upon the accumulation and/or distribution of particulate matter on the filter 150. Additionally, the regeneration command and event characteristics are dependent upon any of various other parameters, such as, for example, the operating conditions of the engine, the availability of future regeneration opportunities, the operating trends of the engine, etc. In certain embodiments, the regeneration module 260 generates the regeneration command by utilizing the particulate filter regeneration principles and strategies described in U.S. patent application Ser. No. 11/301,808 (filed Dec. 13, 2005), Ser. No. 11/301, 998 (filed Dec. 13, 2005), Ser. No. 11/301,701 (filed Dec. 13, 2005), Ser. No. 11/227,857 (filed Sep. 15, 2005), Ser. No. 11/227,403 (filed Sep. 15, 2005), Ser. No. 11/301,693 (filed Dec. 13, 2005), Ser. No. 11/227,828 (filed Sep. 15, 2005), Ser. No. 11/226,972 (filed Sep. 15, 2005), Ser. No. 11/227,060 (filed Sep. 15, 2005), and Ser. No. 12/039,614 (filed Feb. 28, 2008), and U.S. Pat. Nos. 7,231,291; 7,263,825; and 7,188, 512. Each of the above-listed patents and patent applications are incorporated herein by reference.

Figure 4:
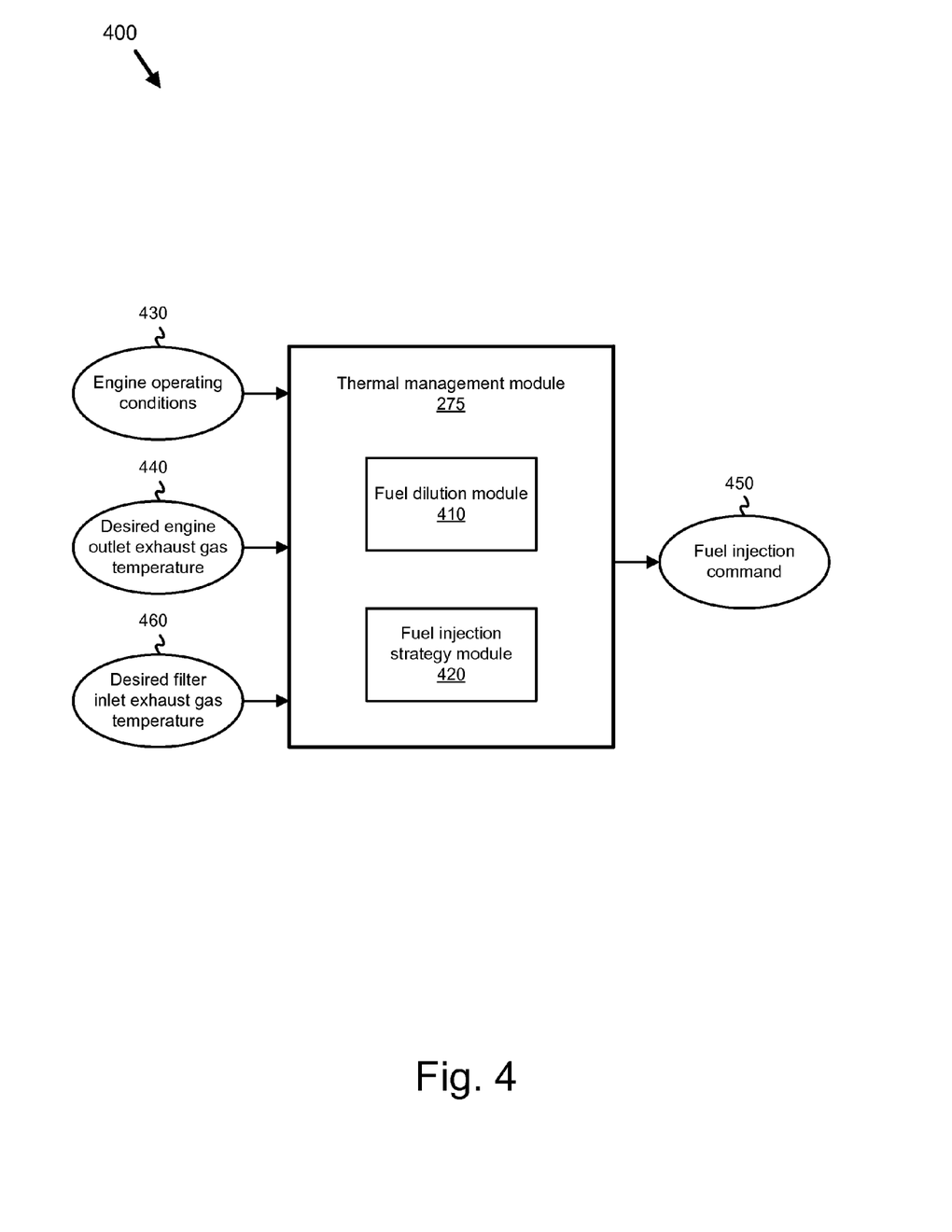
FIG. 4 is a schematic diagram of a thermal management module of the controller of FIG. 2.

The regeneration module 260 communicates the regeneration command, or at least certain portions of the regeneration command, to the thermal management module 275. In one embodiment, the regeneration module 260 communicates the desired engine outlet exhaust gas temperature 440 and desired filter inlet exhaust gas temperature 460 of the regeneration command to the thermal management module 275. Based at least partially on the desired engine outlet exhaust gas temperature 440 and desired filter inlet exhaust gas temperature 460 received from the regeneration module 260 and the operating conditions 430 of the engine received from the conditions module 250, the thermal management module 275 generates a fuel injection command to the fuel injectors. The fuel injectors 135 respond to the fuel injection command by injecting fuel into the compression chambers 111 according to the fuel injection command. The fuel injection command includes instructions for performing a multiple-injection event corresponding to a desired exhaust gas temperature and fuel dilution level for each cycle of the engine. In certain instances, the multiple-injection event is represented by the relative timing of a plurality of fuel injections and the quantity or dosage of fuel injected in each of the plurality of fuel injections. Generally, the multiple-injection event is configured to promote fuel spray vaporization by injecting smaller amounts of fuel into the cylinder for each injection event compared to a single injection event. More fuel spray vaporization results in less fuel spray impinging on the cylinder wall, which translates into a reduced likelihood of fuel blow-by and a reduced level of fuel dilution compared to conventional thermal management strategies. Additionally, a multiple-injection event extends the combustion process to later crank angle positions compared to a single-injection event. Extending the combustion process to later crank angle positions within a misfire limit provides increased engine exhaust gas temperature using smaller amounts of fuel compared to a single-injection event.

Referring to FIG. 4, the thermal management module 275 includes a fuel dilution module 410 and a fuel injection strategy module 420. The fuel dilution module 410 is configured to determine an acceptable, e.g., maximum, fuel dilution level for the engine 110. The acceptable fuel dilution level for a given engine can be experimentally obtained and integrated into a fuel dilution map comparing fuel dilution values against engine operating conditions and/or cycles. The fuel dilution module 410 can determine the acceptable fuel dilution level of the engine 110 by receiving the current operating condition or cycle of the engine and accessing the fuel dilution map.

The fuel injection strategy module 420 is configured to determine a regeneration fuel injection strategy and issue a fuel injection command 450 to the fuel injectors 135. The regeneration fuel injection strategy is at least partially dependent upon the acceptable fuel dilution level determined by the fuel dilution module 410. More specifically, the fuel injection strategy module 420 determines a regeneration fuel injection strategy that will achieve the desired engine outlet exhaust gas temperature 440 and desired filter inlet exhaust gas temperature 460 without exceeding the acceptable fuel dilution level. The regeneration fuel injection strategy is dependent largely upon the operating conditions of the engine 110. For example, the regeneration fuel injection strategy for the engine 110 when operating at idle conditions can be a first regeneration fuel injection strategy, and the regeneration fuel injection strategy for the engine when operating at high speed conditions can be a second regeneration fuel injection strategy different than the first regeneration fuel injection strategy.

The regeneration fuel injection strategies are determined by the fuel injection strategy module 420 on a per cycle basis. In other words, the fuel injection strategy module 420 determines a regeneration fuel injection strategy for each combustion cycle of the engine during a regeneration event initiated by the regeneration module 260. The regeneration event typically includes a period for ramping up the temperature of the particulate filter 150, actual regeneration on the particulate filter at predetermined filter temperatures, and any ramping down of the temperature of the particulate filter.

Figure 5:
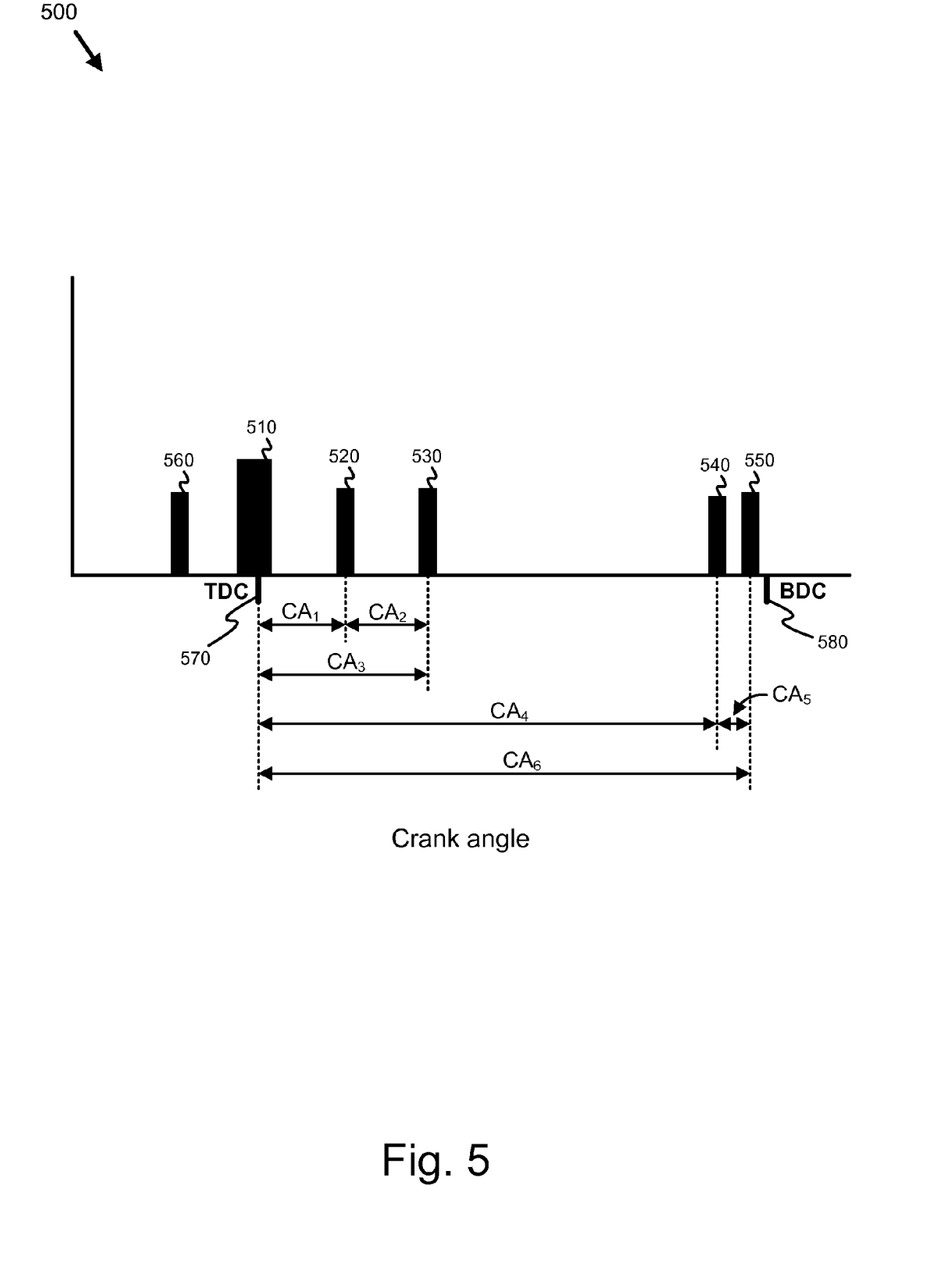
FIG. 5 is a chart showing fuel injections on an engine crank angle line according to one representative embodiment of a regeneration fuel injection strategy.

Referring to FIG. 5, and according to one embodiment, each regeneration fuel injection strategy 500 includes fuel dosage and timing information for a main fuel injection 510, a first heat post-injection 520, and a second heat post-injection 530. The main fuel injection 510 is the primary injection of the combustion event in the cylinder. The main fuel injection 510 occurs whether a regeneration event is occurring or not. Each of the first and second heat post-injections 520, 530 also participate in the combustion event within the cylinder. More specifically, the first and second heat post-injections 520, 530 occur close enough to the main fuel injection 510 that they are involved in the combustion event driven by the main fuel injection 510. Accordingly, as used herein, heat injections are injections where the injected fuel participates in the combustion event.

In some implementations, the regeneration fuel injection strategy 500 includes one or more non-heat post-injections. The illustrated regeneration fuel injection strategy includes two non-heat post-injections 540, 550. Because the non-heat post-injections 540, 550 occur well after the main fuel injection 510, they do not participate in the combustion event within the cylinder. Accordingly, as used herein, non-heat injections are injections where the injected fuel does not participate in the combustion event. Generally, the non-heat post-injections 540, 550 are included in the strategy 500 to enrich the exhaust with hydrocarbons, which act to increase the temperature of the exhaust gas as it flows through the catalytic component 140 such that the exhaust gas temperature exiting the catalytic component 140 is approximately equal to the desired filter inlet exhaust gas temperature 460.

The regeneration fuel injection strategy 500 also includes a pilot fuel injection 560 occurring just prior to the main fuel injection 510. The pilot fuel injection 560 drives a smaller combustion event preceding the main combustion event driven by the main fuel injection 510. The smaller combustion event promotes a gradual increase in the temperature within the compression cylinder prior to the rapid temperature increase associated with the main combustion event. Generally, the smaller combustion event reduces potential negative effects of the sudden temperature increase associated with main combustion events, e.g., engine knock and rattles.

As shown in FIG. 5, the timing and the dosage of the fuel injections 510, 520, 530, 540, 550, 560 can vary. Typically, the timing of a fuel injection is represented by the angle of the crank when the fuel is injected into the compression cylinder. Accordingly the timing of a scheduled fuel injection is represented by the angle of the crank when the fuel is scheduled to be injected into the compression cylinder. Further, because a fuel injection event requires a period of time to inject the required dosage of fuel, for convenience, the timing of a fuel injection is associated with the start of the fuel injection event. In FIG. 5, the timing of the fuel injections are compared against a single combustion cycle timeline from a top-dead center (TDC) position 570 of the crank (i.e., when the piston reaches its uppermost point within the cylinder), to a bottom-dead center (BDC) position 580 of the crank (i.e., when the piston reaches its lowermost point within the cylinder), and back to the TDC position. The TDC position 570 is associated with a crank angle of zero-degrees and the BDC position 580 is associated with a crank angle of 180-degrees. As shown, the main fuel injection occurs near TDC, the first heat post-injection 520 occurs at a first crank angle $CA_1$ relative to the TDC position 570, and the second heat post-injection 530 occurs at a second crank angle $CA_2$ relative to the first crank angle $CA_1$ and a third crank angle $CA_3$ relative to the TDC position. The first non-heat post-injection 540 occurs at a fourth crank angle $CA_4$ relative to the TDC position 570 and the second non-heat post-injection 550 occurs at a fifth crank angle $CA_5$ relative to the fourth crank angle $CA_4$ and a sixth crank angle $CA_6$ relative to the TDC position.

In certain implementations, the first crank angle $CA_1$ is an angle between about 8-degrees and about 30-degrees, the second crank angle $CA_2$ is greater than approximately 5-degrees, the third crank angle $CA_3$ is between about 30-degrees and about 63-degrees, the fourth crank angle $CA_4$ is between about 150-degrees and about 170-degrees, the fifth crank angle $CA_5$ is greater than about 2-degrees, and the sixth crank angle $CA_6$ is between about 160-degrees and about 180-degrees.

The dosage of the fuel injections 510, 520, 530, 540, 550, 560 consists of the fuel flow rate and the fuel injection duration. In other words, the duel dosage can be varied by varying either one or more of the fuel flow rate and fuel injection duration. Generally, better performance is achieved by increasing the flow rate and decreasing the fuel injection duration. However, increasing the desired fuel flow rate typically requires an increase in the capability requirements of the fuel injection system. Accordingly, the fuel flow rate and fuel injection duration are dependent upon the fuel injection system capability.

A regeneration fuel injection strategy 500 having two heat post-injections 520, 530, as opposed to one heat post-injection, provides several advantages. For example, two heat post-injections allow more flexibility in achieving higher exhaust gas temperatures while maintaining acceptable fuel dilution levels. Referring to the chart 600 of FIG. 6, which represents empirical data gathered during testing of a representative engine, the engine outlet exhaust gas temperatures achieved by a single heat-post injection strategy 610 and a dual heat post-injection strategy 620 are comparable. For example, the engine outlet exhaust gas temperature achieved with the dual heat post-injection strategy 620 is nearly the same as the engine outlet exhaust gas temperature achieved with the single heat post-injection strategy. Nevertheless, to achieve the same engine outlet exhaust gas temperature, the fuel dilution encountered when using the dual heat post-injection strategy 620 is significantly lower than the fuel dilution encountered when using the single heat post-injection strategy 610 (e.g., 2.02% versus 6.8% or about 70% less than the fuel dilution encountered with the single heat post-injection strategy). Based on the foregoing, dual heat post-injection strategies provide much less fuel dilution levels at similar exhaust gas temperatures than single heat post-injection strategies. Therefore, utilizing dual heat post-injection strategies as described herein facilitates large or small changes in the engine exhaust gas temperature without significantly affecting the fuel dilution levels.

Figure 6:
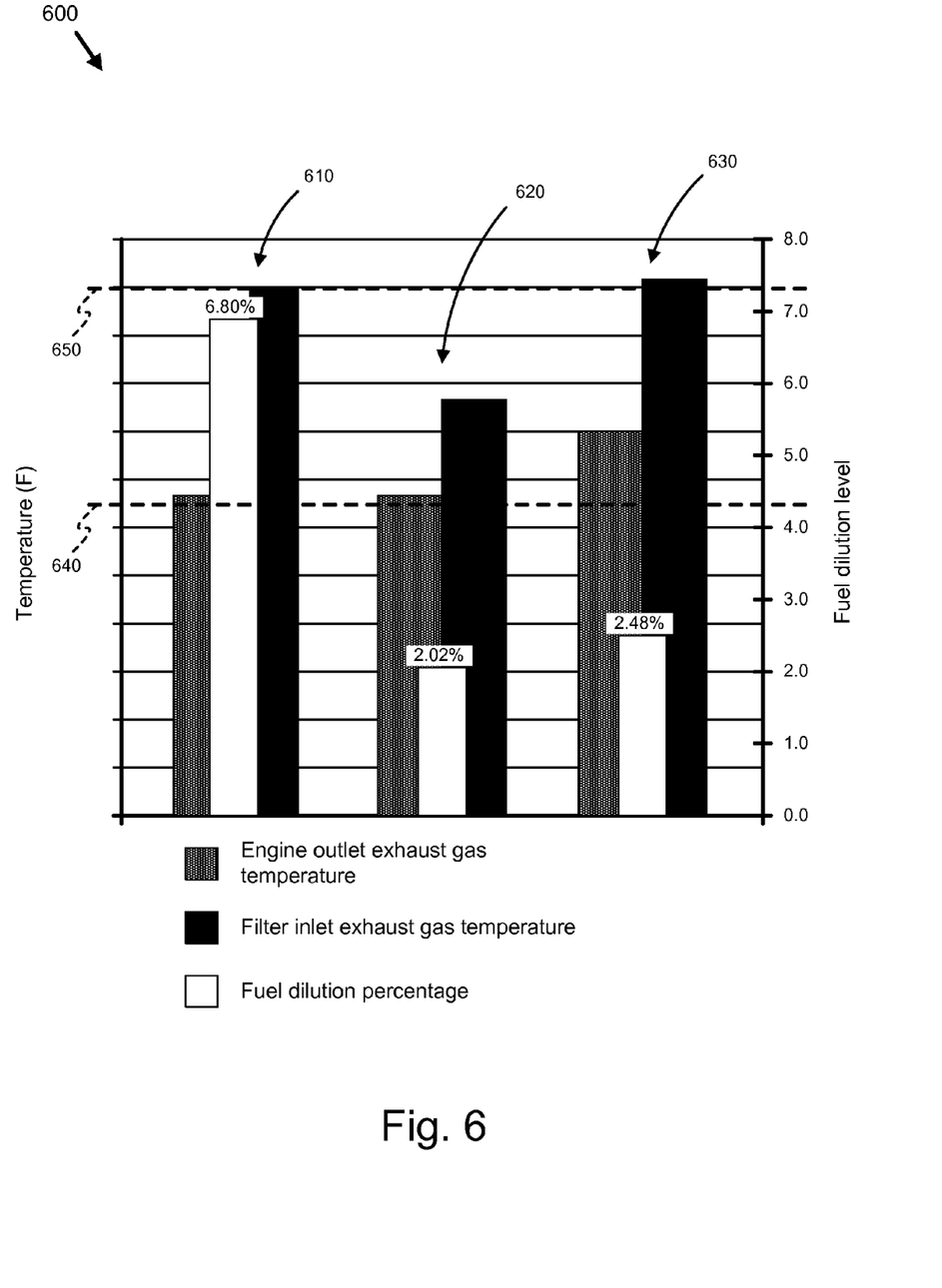
FIG. 6 is a graph comparing engine exhaust gas temperature outlets and fuel dilution levels for a conventional regeneration fuel injection strategy and two regeneration fuel injection strategies according to two embodiments of the present disclosure.

The exhaust gas temperatures, e.g., the engine outlet exhaust gas temperature and filter inlet exhaust gas temperature, achieved with a dual heat post-injection strategy can be increased, without significantly increasing the fuel dilution levels, by adding one or more non-heat post-injections, such as injections 540, 550 of FIG. 5. For example, as shown in FIG. 6, the triple post-injection strategy 630 (i.e., two heat post-injections and one non-heat post-injection) results in an engine outlet exhaust gas temperature that is higher than the target engine outlet exhaust gas temperature 640 and a 64% lower fuel dilution level than using the single heat post-injection strategy although the filter inlet exhaust gas temperature achieved using the single and triple post-injection strategies 610, 630 are about the same.

The chart 600 shows exemplary target engine outlet exhaust gas temperature 640 and target particulate filter inlet exhaust gas temperature 650. As shown, the representative single and triple post-injection strategies 610, 630 both achieve the target filter inlet exhaust gas temperature 650, but the triple post-injection strategy 630 does so while producing a significantly lower fuel dilution level. Moreover, while the single, dual, and triple post-injection strategies 610, 620, 630 achieve the target engine outlet exhaust gas temperature 640, the triple post-injection strategy 630 achieves the target engine outlet exhaust gas temperature and the target filter inlet exhaust gas temperature with a much lower fuel dilution level, which can promote flexibility in determining fuel injection strategies in view of accomplishing other desired engine operating parameters, such as higher fuel economy, and more efficient hydrocarbon conversion in the catalyst component 140.

Regeneration fuel injection strategies having two heat post-injections, such as the regeneration fuel injection strategy 500 shown in FIG. 5, are capable of achieving the same or similar engine exhaust gas temperatures as single heat post-injection strategies, but with lower fuel dilution levels than single heat post-injection strategies for some engine operating conditions. Moreover, regeneration fuel injection strategies employing two heat post-injections are capable of achieving higher engine outlet exhaust gas temperatures than single heat post-injections for other operating conditions. In such operating conditions, single heat post-injections often are not able to achieve a target engine outlet exhaust gas temperature, while the dual heat post-injections are able to achieve the target engine outlet exhaust gas temperature. Further, regeneration fuel injection strategies employing two heat post-injections and one or more non-heat post-injections are capable of achieving higher filter inlet exhaust gas temperatures than dual heat post-injection strategies without non-heat post-injections, but with similar dilution levels as dual heat post-injection strategies without non-heat post-injections.

Figure 7:
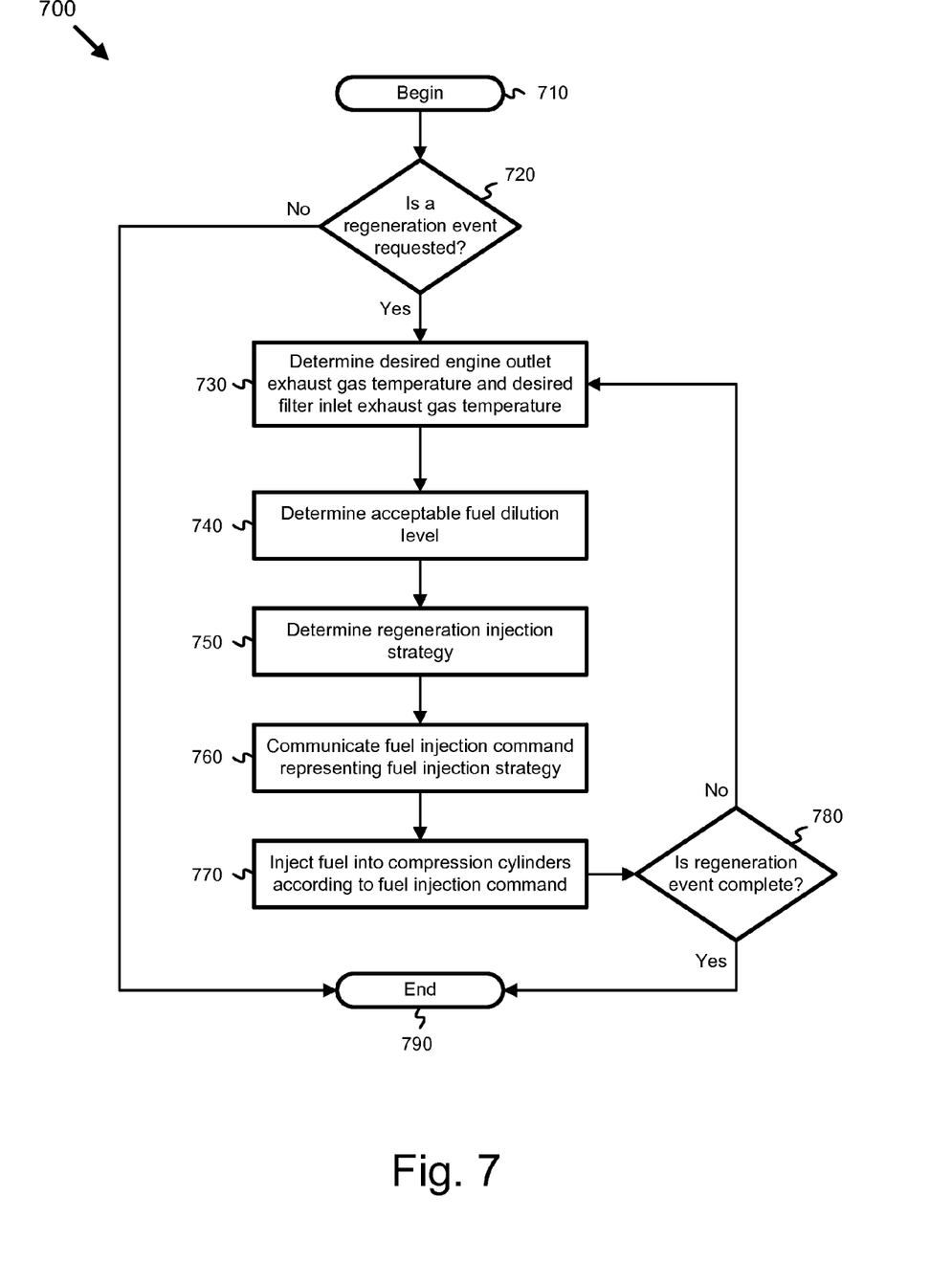
FIG. 7 is a method for controlling engine exhaust gas temperatures and fuel dilution levels in an internal combustion engine according to one embodiment.

Referring to FIG. 7, a method 700 for controlling engine exhaust gas temperatures and fuel dilution levels starts 710 by determining 720 whether a regeneration event has been requested by the regeneration module 260. If a regeneration event has been requested by the regeneration module 260, then the method proceeds to determine 730 a desired engine outlet exhaust gas temperature 440 and desired filter inlet exhaust gas temperature 460 from the regeneration event request. If a regeneration event has not been requested, then the method ends 790. If a regeneration event has been requested, the method also includes determining 740 an acceptable fuel dilution level by operation of the fuel dilution module 410.

Based at least partially on the engine operating conditions 430, desired engine outlet exhaust gas temperature 440, and desired filter inlet exhaust gas temperature 460, the method includes determining 750 a regeneration fuel injection strategy by operation of the fuel injection strategy module 420. The fuel injection strategy includes the timing and dosage of a first heat post-injection and a second heat post-injection, e.g., injections 520, 530. The fuel injection strategy can also include information concerning one or more non-heat post-injections. The timing and dosage of the first and second heat post-injections, as well as the non-heat post-injections, can be determined according to a fuel injection control algorithm based on engine mapping data obtained during engine development, and accessible by or stored on the fuel injection strategy module 420. The dosage of non-heat post-injections can also be determined based on the energy balance and the temperature difference between the engine outlet and the particulate matter filter inlet. Based on the determined fuel injection strategy, a fuel injection command is communicated 760 to the fuel injector system of the engine to inject 770 fuel into the compression cylinders through the injectors corresponding to the determined fuel injection strategy.

The method then determines whether the regeneration event has ended at 780 via communication with the regeneration module 260. If the event has ended, the method ends 790. If the regeneration event has not ended, then the method continues by determining a new desired engine outlet exhaust gas temperature at 730, a new acceptable fuel dilution level at 740, and a new fuel injection strategy at 750. The method then communicates 760 a fuel injection command representing the new fuel injection strategy to the fuel injection system as described above. The method again determines whether the regeneration event has ended at 780 and if not continues at step 740. This iterative process continues until it is determined that the regeneration event has ended at 770.

The schematic flow chart diagrams and method schematic diagrams described above are generally set forth as logical flow chart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for controlling the temperature of the outlet exhaust of an internal combustion engine for a regeneration event on a particulate matter filter, comprising:
   a regeneration module configured to determine a desired engine outlet exhaust gas temperature for a regeneration event; and
   a fuel injection strategy module configured to determine a regeneration fuel injection strategy for achieving the desired engine outlet exhaust gas temperature;
   wherein the regeneration fuel injection strategy comprises a main fuel injection, a first heat post-injection, and a second heat post-injection, wherein fuel from the main fuel injection, first heat post-injection, and second heat post-injection is combusted in a main combustion event within a cylinder of the internal combustion engine.

2. The apparatus of claim 1, wherein:
the regeneration module is further configured to determine a desired particulate matter filter inlet exhaust gas temperature;
the fuel injection strategy module is configured to determine a regeneration fuel injection regeneration for achieving the desired engine outlet exhaust gas temperature and desired particulate matter filter inlet exhaust gas temperature; and
the fuel injection strategy comprises at least one non-heat post-injection, wherein fuel from the at least one non-heat post-injection is injected into the cylinder but not combusted in the main combustion event within the cylinder.

3. The apparatus of claim 2, wherein the fuel injection strategy comprises at least two non-heat post-injections, wherein fuel from each of the at least two non-heat post-injections is injected into the cylinder but not combusted in the main combustion event within the cylinder.

4. The apparatus of claim 1, wherein the main fuel injection is scheduled to occur at a crank angle of approximately zero-degrees, the first heat post-injection is scheduled to occur at a crank angle between approximately 8-degrees and approximately 30-degrees, and the second heat post-injection is scheduled to occur at a crank angle between approximately 30-degrees and approximately 63-degrees.

5. The apparatus of claim 4, wherein the crank angle at which the second heat post-injection is scheduled to occur is at least 5-degrees greater than the crank angle at which the first heat post-injection is scheduled to occur.

6. The apparatus of claim 2, wherein the at least one non-heat post-injection is scheduled to occur at a crank angle between approximately 150-degrees and approximately 170-degrees.

7. The apparatus of claim 3, wherein the at least two non-heat post-injections comprise a first non-heat post-injection and a second non-heat post-injection, the first non-heat post-injection being scheduled to occur at a crank angle between approximately 150-degrees and approximately 170-degrees and the second non-heat post-injection being scheduled to occur at a crank angle between approximately 160-degrees and approximately 180-degrees.

8. The apparatus of claim 7, wherein the crank angle at which the second non-heat post-injection is scheduled to occur is at least 2-degrees greater than the crank angle at which the first non-heat post-injection is scheduled to occur.

9. The apparatus of claim 1, further comprising a fuel dilution module configured to determine a maximum fuel dilution level of the engine, wherein the regeneration fuel injection strategy is configured to achieve an actual fuel dilution level below or equal to the maximum fuel dilution level.

10. The apparatus of claim 9, wherein the maximum fuel dilution level is less than or equal to approximately 5%.

11. The apparatus of claim 2, wherein a fuel dosage of the first heat post-injection is between about 100% and about 500% of a fuel dosage of the main fuel injection, a fuel dosage of the second heat post-injection is between about 100% and about 200% of the fuel dosage of the first heat post-injection, and a fuel dosage of the at least one non-heat post-injection is between about 10% and about 100% of the fuel dosage of the second heat post-injection.

12. A method for controlling the temperature of the outlet exhaust of an internal combustion engine for a regeneration event on a particulate matter filter, the method comprising:
determining a desired engine outlet exhaust gas temperature;
determining a maximum fuel dilution level of the engine;
determining a regeneration fuel injection strategy for achieving the desired engine outlet exhaust gas temperature and an actual fuel dilution level at or below the maximum fuel dilution level, the regeneration fuel injection strategy comprising a main fuel injection, a first heat post-injection, and a second heat post-injection; and
injecting fuel into a compression chamber of the internal combustion engine according to the regeneration fuel injection strategy, wherein fuel from the main fuel injection, first heat post-injection, and second heat post-injection is combusted in a main combustion event within the compression chamber.

13. The method of claim 12, further comprising determining a desired particulate matter inlet exhaust gas temperature, wherein determining the regeneration fuel injection strategy comprises determining a regeneration fuel injection strategy for achieving the desired engine outlet exhaust gas temperature, the desired particulate matter inlet exhaust gas temperature, and an actual fuel dilution level at or below the maximum fuel dilution level, and wherein the fuel injection strategy further comprises at least one non-heat post-injection, wherein fuel from the at least one non-heat post-injection is not combusted in the main combustion event within the compression chamber.

14. The method of claim 13, wherein the main fuel injection is scheduled to occur at a crank angle of approximately zero-degrees, the first heat post-injection is scheduled to occur at a crank angle between approximately 8-degrees and approximately 30-degrees, the second heat post-injection is scheduled to occur at a crank angle between approximately 30-degrees and approximately 63-degrees, and the at least one non-heat post-injection is scheduled to occur at a crank angle between approximately 150-degrees and approximately 170-degrees.

15. The method of claim 12, wherein the desired engine outlet exhaust gas temperature is a first desired engine outlet exhaust gas temperature corresponding to a first operating condition of the engine, the regeneration fuel injection strategy is a first regeneration fuel injection strategy, and the main fuel injection is a first main fuel injection, the method further comprising:
determining a second desired engine outlet exhaust gas temperature corresponding to a second operating condition of the engine;
determining a second regeneration fuel injection strategy for achieving the second desired engine outlet exhaust gas temperature and an actual fuel dilution level at or below the maximum fuel dilution level, the second regeneration fuel injection strategy comprising a second main fuel injection, a third heat post-injection, and a fourth heat post-injection; and
injecting fuel into the compression chamber according to the second regeneration fuel injection strategy.

16. The method of claim 12, wherein the desired engine outlet exhaust gas temperature is a first desired engine outlet exhaust gas temperature corresponding to a first operating condition of the engine, the maximum fuel dilution level is a first maximum fuel dilution level, the regeneration fuel injection strategy is a first regeneration fuel injection strategy, and the main fuel injection is a first main fuel injection, the method further comprising:
determining a second desired engine outlet exhaust gas temperature corresponding to a second operating condition of the engine;

determining a second maximum fuel dilution level corresponding to the second operating condition of the engine;

determining a second regeneration fuel injection strategy for achieving the second desired engine outlet exhaust gas temperature and an actual fuel dilution level at or below the second maximum fuel dilution level, the second regeneration fuel injection strategy comprising a second main fuel injection, a third heat post-injection, and a fourth heat post-injection; and injecting fuel into the compression chamber according to the second regeneration fuel injection strategy.

17. An internal combustion engine system, comprising:

an internal combustion engine generating an engine outlet exhaust;

a particulate matter filter in exhaust receiving communication with the internal combustion engine;

a controller comprising:
   an engine conditions module configured to determine operating conditions of the engine;
   a regeneration module configured to determine a desired temperature of the engine outlet exhaust gas, the desired engine outlet exhaust gas temperature based at least partially on a desired particulate matter filter inlet exhaust gas temperature for conducting a regeneration event on the particulate matter filter;
   a thermal management module configured to determine (i) a fuel dilution threshold level of the internal combustion engine and (ii) a regeneration fuel injection strategy for achieving the desired engine outlet exhaust gas temperature and an actual fuel dilution level below the fuel dilution threshold level, wherein the regeneration fuel injection strategy comprises a first primary combustion fuel injection, a second subsidiary combustion fuel injection following the first primary combustion fuel injection, and a third subsidiary combustion fuel injection following the second subsidiary combustion fuel injection, wherein fuel from the first primary combustion fuel injection, second subsidiary combustion fuel injection, and third subsidiary combustion fuel injection is combusted in a main combustion event within a cylinder of the internal combustion engine.

18. The internal combustion engine system of claim 17, wherein:
   the regeneration fuel injection strategy is further configured to achieve the desired particulate matter filter inlet exhaust gas temperature; and
   the regeneration fuel injection strategy comprises a fourth subsidiary non-combustion fuel injection following the third subsidiary combustion fuel injection;
   wherein fuel from the fourth subsidiary non-combustion fuel injection is injected into the cylinder but not combusted in the main combustion event within the cylinder.

19. The internal combustion engine system of claim 18, wherein the regeneration fuel injection strategy comprises a fifth subsidiary non-combustion fuel injection following the fourth subsidiary non-combustion fuel injection, wherein fuel from the fifth subsidiary non-combustion fuel injection is injected into the cylinder but not combusted in the main combustion event within the cylinder.

20. The internal combustion engine system of claim 18, wherein the first primary combustion fuel injection is scheduled to occur at a crank angle of about zero-degrees, the second subsidiary combustion fuel injection is scheduled to occur at a crank angle between approximately 8-degrees and approximately 30-degrees, the third subsidiary combustion fuel injection is scheduled to occur at a crank angle between approximately 30-degrees and approximately 63-degrees, and the fourth subsidiary combustion fuel injection at a crank angle between approximately 150-degrees and approximately 170-degrees.

21. The internal combustion engine system of claim 17, wherein a fuel dosage of the second subsidiary combustion fuel injection is less than a fuel dosage of the first primary combustion fuel injection, and a fuel dosage of the third subsidiary combustion fuel injection is equal to or less than the fuel dosage of the second subsidiary combustion fuel injection.

22. The internal combustion engine system of claim 21, wherein the fuel dosage of the second subsidiary combustion fuel injection is between about 5% and about 100% of the fuel dosage of the first primary combustion fuel injection, and the fuel dosage of the third subsidiary combustion fuel injection is between about 5% and about 100% of the fuel dosage of the second subsidiary combustion fuel injection.

23. The internal combustion engine system of claim 18, wherein a fuel dosage of the second subsidiary combustion fuel injection is less than a fuel dosage of the first primary combustion fuel injection, a fuel dosage of the third subsidiary combustion fuel injection is equal to or less than the fuel dosage of the second subsidiary combustion fuel injection, and a fuel dosage of the fourth subsidiary non-combustion fuel injection is less than the fuel dosage of the third subsidiary combustion fuel injection.

24. The internal combustion engine system of claim 23, wherein the fuel dosage of the second subsidiary combustion fuel injection is between about 5% and about 100% of the fuel dosage of the first primary combustion fuel injection, the fuel dosage of the third subsidiary combustion fuel injection is between about 5% and about 100% of the fuel dosage of the second subsidiary combustion fuel injection, and the fuel dosage of the fourth subsidiary non-combustion fuel injection is between about 10% and about 100% of the fuel dosage of the third subsidiary combustion fuel injection.

25. A fuel injection strategy for injecting fuel into a compression chamber of an internal combustion engine, comprising:
   a main fuel injection scheduled to participate in a combustion event within the compression chamber;
   a first subsidiary fuel injection following the main fuel injection, the first subsidiary fuel injection scheduled to participate in the combustion event within the compression chamber;
   a second subsidiary fuel injection following the first subsidiary fuel injection, the second subsidiary fuel injection scheduled to participate in the combustion event within the compression chamber; and
   a third subsidiary fuel injection following the second subsidiary fuel injection, the third subsidiary fuel injection scheduled to not participate in the combustion event within the compression chamber.

* * * * *